(12) United States Patent
Kurtz

(10) Patent No.: US 6,822,755 B2
(45) Date of Patent: *Nov. 23, 2004

(54) METHOD AND APPARATUS FOR DETECTING FACSIMILE TRANSMISSIONS OVER A NETWORK

(75) Inventor: Lew Kurtz, Sunnyvale, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,275

(22) Filed: Jun. 30, 1998

(65) Prior Publication Data

US 2003/0133144 A1 Jul. 17, 2003

(51) Int. Cl.[7] .............................. H04L 12/28
(52) U.S. Cl. ....................... 358/1.15; 358/468
(58) Field of Search ................... 358/407, 402, 358/403, 442, 443, 468; 379/100.01, 100.09, 100.13, 100.12, 100.8; 370/237, 352, 401, 475, 471, 463, 465; 395/200.79, 182.18

(56) References Cited

U.S. PATENT DOCUMENTS

| | | | | |
|---|---|---|---|---|
| 5,684,945 A | * | 11/1997 | Chen et al. | 395/182.18 |
| 5,926,745 A | * | 7/1999 | Threadgill et al. | 455/12.1 |
| 5,940,598 A | * | 8/1999 | Strauss et al. | 395/200.79 |
| 5,963,621 A | * | 10/1999 | Dimolitsas et al. | 379/93.08 |
| 6,009,469 A | * | 12/1999 | Mattaway et al. | 370/237 |
| 6,023,470 A | * | 2/2000 | Lee et al. | 370/401 |
| 6,038,037 A | * | 3/2000 | Leung et al. | 358/434 |
| 6,064,653 A | * | 5/2000 | Farris | 370/237 |
| 6,069,890 A | * | 5/2000 | White et al. | 370/352 |
| 6,097,797 A | * | 8/2000 | Oseto | 379/100.08 |

OTHER PUBLICATIONS

"Interpreting the Group 3 FAX Set–Up Protocol", John R. Treicheier, Applied Signal Technology, Inc. May 1988.*

* cited by examiner

Primary Examiner—Thomas D. Lee
Assistant Examiner—Stephen Brinich
(74) Attorney, Agent, or Firm—Blakely, Sokoloff, Taylor & Zafman LLP

(57) ABSTRACT

To detect facsimile calls that are initiated manually by a user, a method is used that utilizes the detection of a called (CED) tone generated by a receiving facsimile machine. The detection is performed by a signal processor. Once the detection is made, the facsimile call is transmitted using an appropriate protocol.

21 Claims, 5 Drawing Sheets

METHOD AND APPARATUS FOR DETECTING FACSIMILE TRANSMISSIONS OVER A NETWORK

BACKGROUND OF THE INVENTION

1. Field of the Invention

This invention is related to providing more robust transmission of facsimile calls over a network. Specifically, the invention provides a method and apparatus for detecting facsimile transmissions and reconfiguring the network to deal with the transmissions.

2. Description of Related Art

With the increase in interconnectivity between offices for Intranet applications, there is an increase in the transfer of both data and voice information. Accordingly, there is a growing application of routing calls off of the public switched telephone network (PSTN) and onto data networks. One current type of network that is used in many implementations is an Internet Protocol (IP) data network. Other network technologies that are currently implemented include such technology as asynchronous transfer mode (ATM) networks.

On IP networks, data, packaged in packets, is typically sent using one of two types of protocols. The first type of protocol, the user datagram protocol (UDP), delivers data quickly, but potentially unreliably. In addition, UDP does not provide notice so as to indicate whether messages have been received successfully.

The second type of protocol, Transmission Control Protocol (TCP) guarantees the integrity of transmitted data and notifies the sender of success or failure of the receipt of transmitted data. This guarantee is achieved through the use of acknowledgment messages and the resending of unreceived packets (i.e., retries for unsuccessful transmissions). However, using acknowledgment messages and subsequent retries add to the latency of each transmission, so the effective data transmission rate for TCP is lower than UDP.

Thus, there is a tradeoff between using UDP and TCP as both protocols have their advantages and disadvantages. UDP provides a fast transmission protocol with minimal delay but no guarantee as to delivery or sequence. TCP, on the other hand, provides guaranteed delivery of packets in the order in which they are sent. However, the robustness of TCP comes at a price of overhead in timing. The choice of which protocol to use necessarily depends on the needs of the application.

For example, near real-time information such as voice calls are typically transmitted over IP networks using UDP. UDP works well for transmitting voice information because UDP is a faster protocol, keeping delays down to a tolerable level. Usually, approximately 30 milliseconds of audio (e.g., voice information) are contained in each packet. Consequently, if a packet is lost during transmission, the conversation is not seriously affected. TCP is not normally used for transmission of near real-time audio information as too much delay may be introduced as acknowledgment is required for each packet and retransmission of lost packets is necessary.

In contrast to voice calls, facsimile calls require that the receiving facsimile machine receive all data sent by the sending facsimile machine. A lost packet means a page might not be correctly received, which requires that the page would then have to be retransmitted. Consequently, facsimile calls are typically sent via TCP. Facsimile calls can be sent by TCP as, unlike voice calls, facsimile calls can tolerate the latency in data transfer inherent in transmitting information by TCP.

Another consideration with sending voice and facsimile information over any data network—not just IP networks—is that typically voice information is compressed using lossy algorithms (algorithms that do not exactly reproduce the input signal), allowing more voice calls per unit of bandwidth. Facsimile calls, however, cannot be compressed using lossy algorithms since all facsimile information sent must be received.

According to the International Telecommunication Union (ITU) Telecommunication Standardization Sector's Recommendation T.30, a facsimile machine is either a manual facsimile machine or an automatic facsimile machine. Automatic facsimile machines can perform all of the following tasks automatically (i.e., without operator intervention): (1) call establishment and call release; (2) compatibility checking, status and control command; (3) checking and supervision of line conditions; and (4) control functions and facsimile operator recall. Manual facsimile machines, however, require operator assistance with one or more of the above listed tasks. An automatic facsimile machine is treated as a manual facsimile machine for any communications sessions during which an operator has to supervise one or more of the above-listed tasks.

During a facsimile call from one automatic facsimile machine (calling facsimile machine) to another automatic facsimile machine (called facsimile machine), the calling facsimile machine first dials the telephone number of the called facsimile machine and then begins to send a calling tone (CNG). When the called facsimile machine detects and answers the call, the called facsimile machine sends out a called tone (CED). Once both parties detect the respective tone sent by the other party, the facsimile transmission/receipt procedures are then followed to complete the facsimile call.

The problem of detecting and handling facsimile transmissions are present in any network where audio data is treated differently from other data. For example, where the network performs compression on audio data that does not allow the regeneration of the original data, facsimile data may not be faithfully reproduced if the facsimile data is treated like audio data and undergoes compression during transfer. Thus, in all networks where facsimile data is changed, facsimile calls might be adversely affected.

As facsimile calls need to be transmitted by TCP and voice calls by UDP, an IP gateway must determine if the call is a voice call or a facsimile call. Currently, IP gateways detect the CNG tones from a calling machine to identify that the call is a facsimile call. However, for a manual facsimile transmission, where a user manually dials the called facsimile machine, no CNG tone is usually sent by the calling facsimile machine. Therefore, the IP gateways involved in the call have no indication that communications need to be switched over to TCP for the duration of the call.

One solution is to have separate networks for voice and facsimile calls. This solution is more reliable, but is also more expensive. A duplicate set of equipment must be dedicated to the facsimile network and the voice network. Thus, all voice calls are carried by one network while a separate network carries all facsimile calls. Also, this method does not handle the situation of when a call is first started as a voice call, and then one party wishes to send a facsimile during the same call.

Therefore, it would be desirable to be able to handle manually initiated facsimile calls without the use of a dedicated network.

SUMMARY

To detect facsimile calls sent over a data network, the present invention utilizes the detection of a called (CED) tone that is generated by a receiving facsimile machine. A processor located in a CED detection facility may perform the detection. The CED detection facility monitors calls that are sent over a data network, and, after the detection of a CED tone, configures the data network to transmit the facsimile call using a transmission protocol suitable for sending facsimile transmission.

In one embodiment, the data network is an Internet Protocol (IP) network and the signal processor is located in an IP gateway contained in the IP network. Once the detection is made, the facsimile call is transmitted using transmission control protocol (TCP) and in an uncompressed fashion. Non-facsimile calls may be transmitted in a lossy and a best-attempt mode of delivery.

In another embodiment, a set of signal processors is located on the network for providing CED detection for the facsimile calls of any facsimile devices on the network. Once detection has been made, the appropriate network devices through which the facsimile call passes are appropriately configured.

Thus, the present invention is capable of allowing the use of one network to transmit both voice and facsimile calls.

DETAILED DESCRIPTION

The present invention provides a method and apparatus for detecting facsimile transmissions of facsimile calls in a network. For purposes of explanation, specific embodiments are set forth to provide a thorough understanding of the present invention. However, it will be understood by one skilled in the art, from reading this disclosure, that the invention may be practiced without these details. Further, although the present invention is described through the use of IP networks, most, if not all, aspects of the invention apply to networks in general. Moreover, well-known elements, devices, process steps and the like are not set forth in detail in order to avoid obscuring the present invention.

Figure 1:
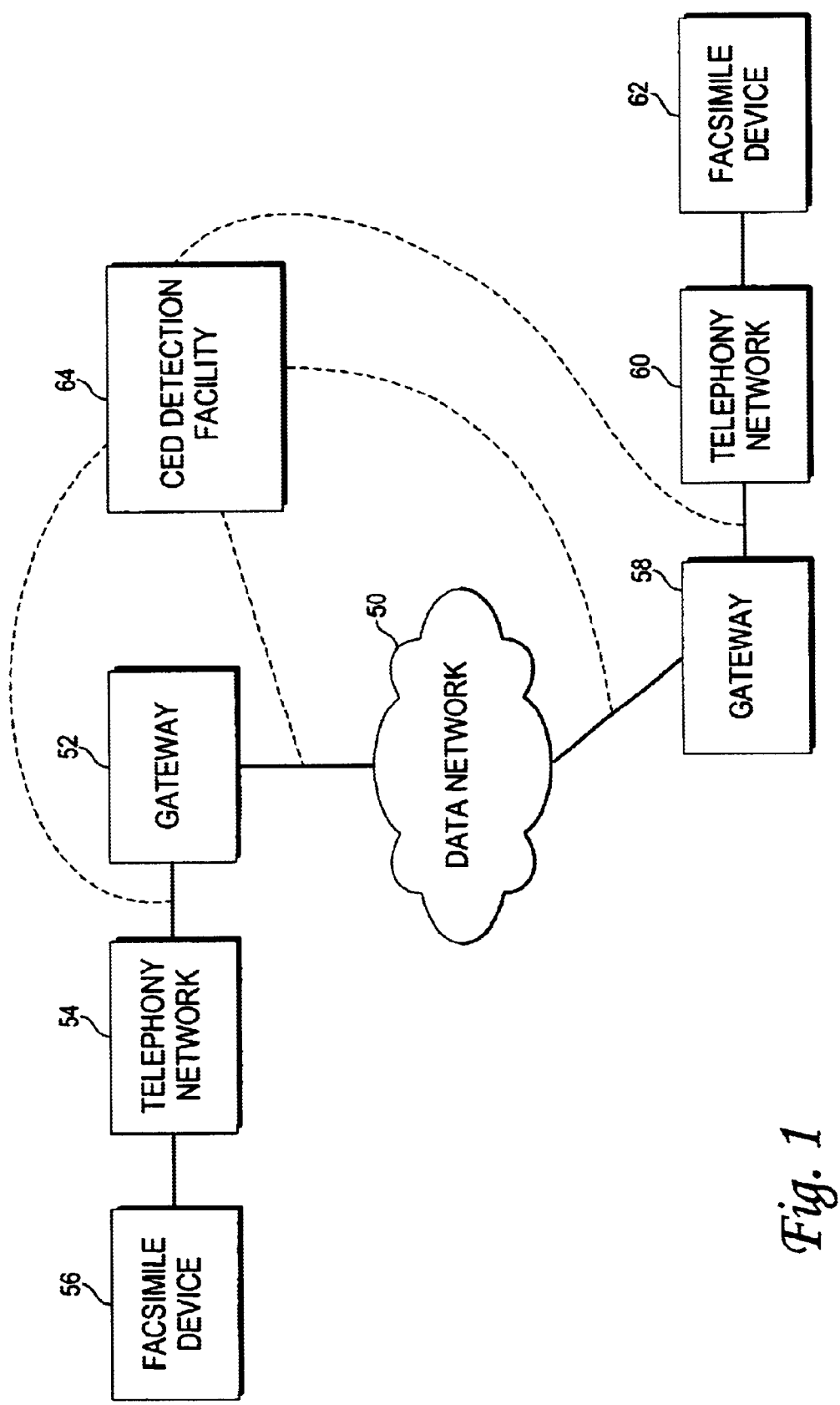
FIG. 1 is a block diagram of a communication network configured in accordance with one embodiment of the present invention.

FIG. 1 is a block diagram of a communication network including data network 50 over which both audio and other data is transmitted. Coupled to data network 50 is a facsimile device 56. Facsimile device 56 is connected to data network 50 through telephony network 54 and gateway 52. Also connected to data network 50 is a gateway 58, through which a facsimile device 62 communicates with facsimile device 56 and with other suitable devices accessible through telephony network 60. In one embodiment, data network 50 is a network capable of transferring audio data. Audio data includes data from facsimile devices such as facsimile device 56 and facsimile 62.

Facsimile device 56 is an automatic facsimile machine that may be used as a manual facsimile machine (that is, a user can manually dial another facsimile machine that is either automatic or manual, optionally engage in voice transmission, and then initiate a facsimile call). A facsimile device 62 is similarly an automatic facsimile machine that may be operated as a manual facsimile machine. In addition, facsimile device 56 and facsimile device 62, although described as automatic facsimile devices, may be manual facsimile devices. Further, facsimile device 56 and facsimile device 62 may also be implemented as computer facsimile interfaces, such as those found in integrated data/facsimile modem interfaces used in personal computers. Thus, any facsimile device that can operate in a mode as proposed by the International Telecommunication Union Standardization Sector's Recommendation T.30 may be substituted in this discussion for facsimile device 56 and facsimile device 62.

Telephony network 54 and telephony network 60 may be either privately owned networks or public networks. In one embodiment, telephony network 54 and telephony network 60 are contained in one telephony network. In this embodiment, telephony network may be a wide-area telephony network such as the public switched telephone network (PSTN), which is a network of interconnected systems operated by the various telephone companies and administrations around the world. In another embodiment, telephony network 54 and telephony network 60 are separate telephony networks. Accordingly, telephony network 54 and telephony network 60 may consist of equipment that is private and proprietary to a company (i.e., private branch exchange (PBX)), or public equipment (i.e., a central office owned by the telephone network).

In one embodiment, a called (CED) tone detection facility 64 is connected to gateway 52 and gateway 58 through data network 50. CED detection facility 64 provides the necessary system for detecting a CED tone generated by any facsimile device. In another embodiment, CED detection facility 64 is connected to gateway 52 and gateway 58 through telephony network 54 and telephony network 60, respectively. As those skilled in the art will appreciate, a gateway is an interface between two networks. In yet another embodiment, one or more CED detection facilities can be implemented somewhere on the communication pathway between facsimile device 62 and facsimile device 63 to implement CED tone detection, and does not necessarily have to be physically located near the facsimile devices. Thus, it is to be noted that the functions provided by CED detection facility 64 may be provided anywhere between facsimile device 56 and facsimile device 62.

Figure 2:
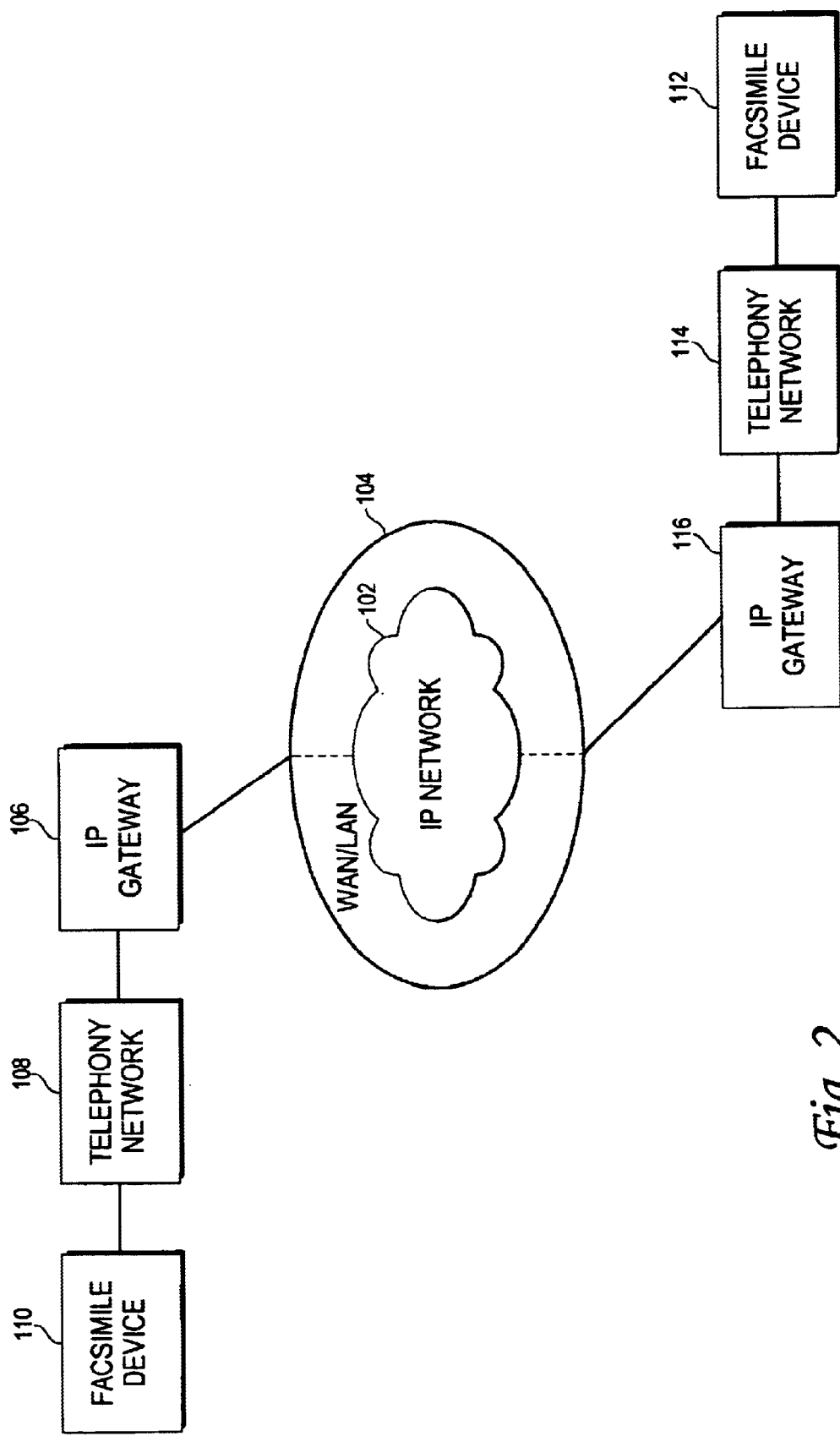
FIG. 2 is a block diagram of a communications network configured in accordance with another embodiment of the present invention.

FIG. 2 is a block diagram of a communication network containing an Internet Protocol (IP) network 102 contained in a Wide Area Network or Local Area Network (WAN/LAN) 104. IP network 102 is an IP network which may be used to carry both voice calls and facsimile calls. Thus, IP network 102 may carry transmission control protocol (TCP) traffic as well as user datagram protocol (UDP) traffic or any other suitable protocol traffic. Connected to IP network 102 is a IP gateway 106, which is connected to a telephony network 108. In one embodiment, IP gateway 106 is a voice over IP gateway.

Similar to telephony network 54 and telephony network 60, telephony network 108 may consist of equipment that is private and proprietary to a company, or public equipment. Connected to telephony network 108 is a facsimile device 110, which, similar to facsimile device 56 and facsimile device 62, is an automatic facsimile machine that may be used as a manual facsimile. A facsimile device 112 is also an automatic facsimile machine that may be operated as a manual facsimile machine. Both facsimile device 110 and facsimile device 112 may also be manual facsimile devices. Facsimile device 112 is connected to a telephony network 114 that may be either a privately owned network or a public lease switched network. Telephony network 114 is connected to an IP gateway 116 that is connected to IP network 102 in WAN 104.

It is to be noted that in FIG. 2, the components which are used to describe the present invention are contained in functional block diagrams. Therefore, functions which can be provided by a single element are still separated for purposes of describing the present invention. For example, telephony network 108 and telephony network 114 may also be contained in WAN/LAN 104. Alternatively, telephony network 108 or telephony network 114 is contained in WAN/LAN 104. Thus, similar to telephony network 54 and telephony network 60, telephony network 108 and telephony network 114 may be implemented as integrated or separate telephony networks.

Figure 3:
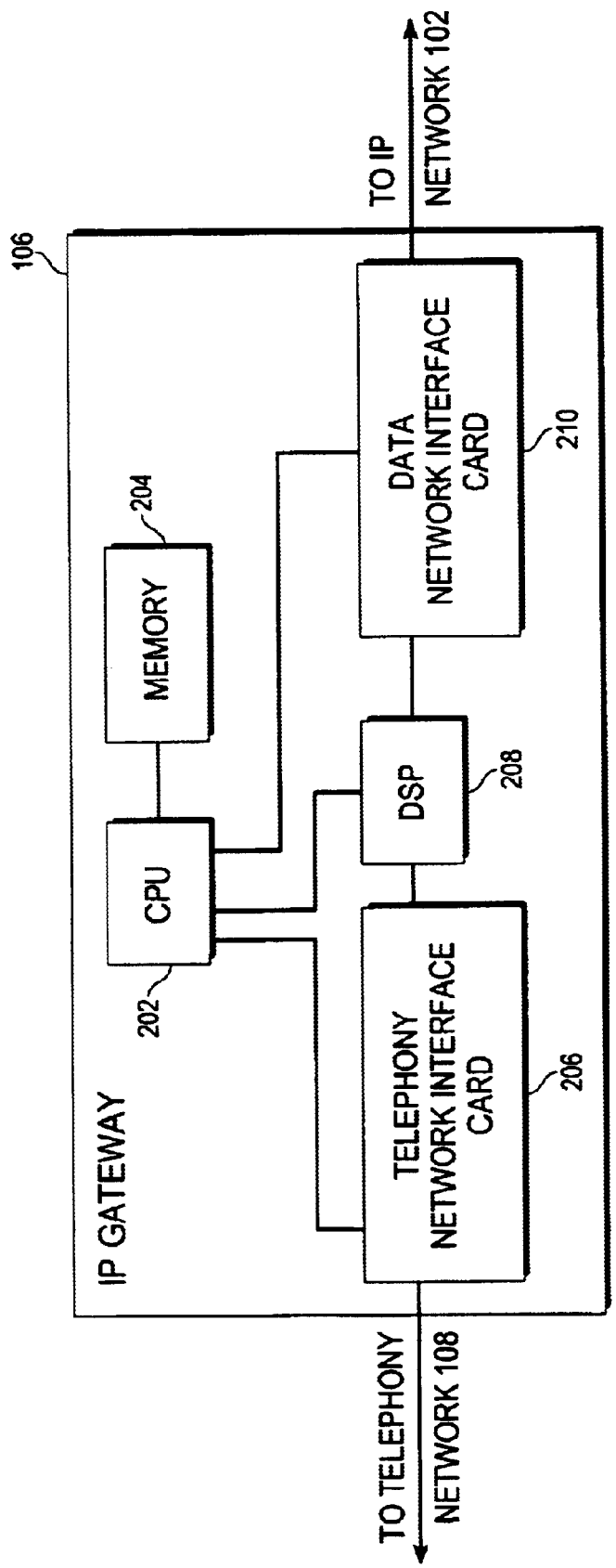
FIG. 3 is a block diagram of an Internet Protocol (IP) gateway contained in the communications network of FIG. 2 that is configured in accordance with one embodiment of the present invention.

FIG. 3 is a functional block diagram of IP gateway 106, which is configured in accordance with one embodiment of the present invention. IP gateway 106 contains a general purpose processor central processing unit (CPU) 202 coupled to a memory 204. Memory 204 can be a non-volatile memory (e.g., a hard disk, flash memory, etc.), a volatile memory (e.g., random access memory (RAM)), or a combination of the two.

CPU 202 is connected to and controls a telephony network interface card (NIC) 206, a digital signal processor (DSP) 208 and a data network interface card (NIC) 210. As stated above, CPU 202 may be any suitable general purpose processor, including, for example, micro processors from Intel Corporation®, Sun Microsystems, Inc.®, National Semiconductor Corporation®, or Motorola, Inc.®.

Telephony NIC 206 is connected to telephony network 108 via a digital or analog telephone line to provide access to IP network 102 for facsimile device 110. In one embodiment, a suitable telephony NIC may be the model D/240PCI-T1 telephone interface from Dialogic®. In an alternative embodiment, a suitable telephony NIC may be the model FS4000 telephone interface from Linkon®.

Data NIC 210 is connected to IP network 102 for sending packetized data (i.e., packets) over an IP network. In one embodiment, if IP network 102 is implemented using Ethernet protocol, then an Ethernet network interface card may be used for data NIC 210. In another embodiment, where IP network 102 is implemented using Frame Relay, then a Frame Relay network interface card may be used for data NIC 210. It is to be noted that any suitable data network technology may be used to implement IP network 102.

If the signals received from telephony NIC 206 are analog in nature, DSP 208 may translate the signals to a digital format which is suitable for data NIC 210. If the connection to telephony network 108 is digital in nature, such as an integrated services digital network (ISDN) connection, then DSP 208 may be only necessary for performing translation (i.e., translation from one encoding scheme to another), and tone detection. Similarly, DSP 208 also performs digital-to-analog signal conversion for signals received from data NIC 210 to telephony NIC 206, as necessary.

CPU 202 controls the operation of telephony NIC 206, DSP 208, and data NIC 210 as described further below to allow the proper detection of a manually initiated facsimile call, as explained in FIG. 5.

Figure 4:
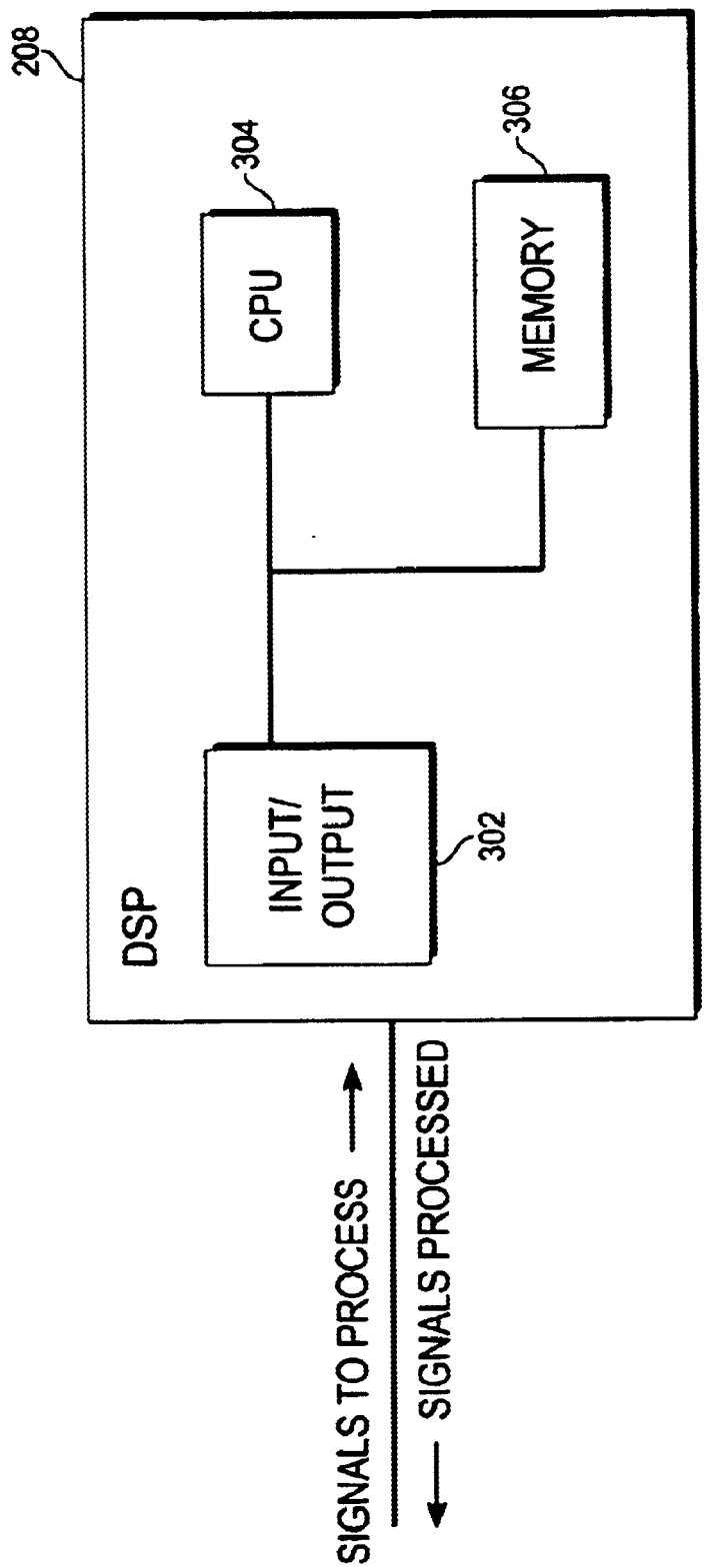
FIG. 4 is a block diagram of a digital signal processor contained in the IP gateway of FIG. 3 that is configured in accordance with one embodiment of the present invention.

FIG. 4 is a block diagram of DSP 208 containing an input/output unit 302 central processing unit (CPU) 304, and a memory 306. CPU 304 can be a general purpose processor as CPU 202, or an application specific integrated circuit (ASIC) that is designed purely to work as a digital signal processor. For example, CPU 304 may be a DSP from Motorola® or Texas Instruments®. Also, memory 306 may be a non-volatile memory (e.g. read only memory or flash-programmable memory), a volatile memory (e.g., random access memory), or a combination of the two types of memory as necessary for the operation of DSP 208.

In operation, input/output unit 302 receives signals from either data NIC 210 or telephony NIC 206 and transfers the signals to be processed to CPU 304. In an alternative embodiment, input/output unit 302 transfers the signals to be processed directly to memory 306 and then notifies CPU 304. CPU 304 can then process those signals, a portion of which may be stored in memory 306 as necessary (i.e., where memory 306 may operate as a buffer), before sending it back to input/output unit 302 to output to telephony NIC 206 or data NIC 210, respectively.

It is to be noted that the functions provided by CPU 202 and CPU 304 (i.e., DSP 208), may be provided by other architectures. For example, a single processor may be used, or, in the alternative, one or more processors contained in one or more devices located on the telephony or the IP network may be used to provide the functionality described above. In addition, it is contemplated that CED tone detection may be provided by one or more DSPs that are not necessarily located in IP gateway 106. For example, a CED tone detection facility having multiple DSPs (e.g., a DSP "farm") may be used to provide CED tone detection functions for any number of gateways. Thus, as discussed in the description of FIG. 1, the CED tone detection facility 64 is not required to be physically attached to a particular gateway or directly connected to the data network.

Figure 5:
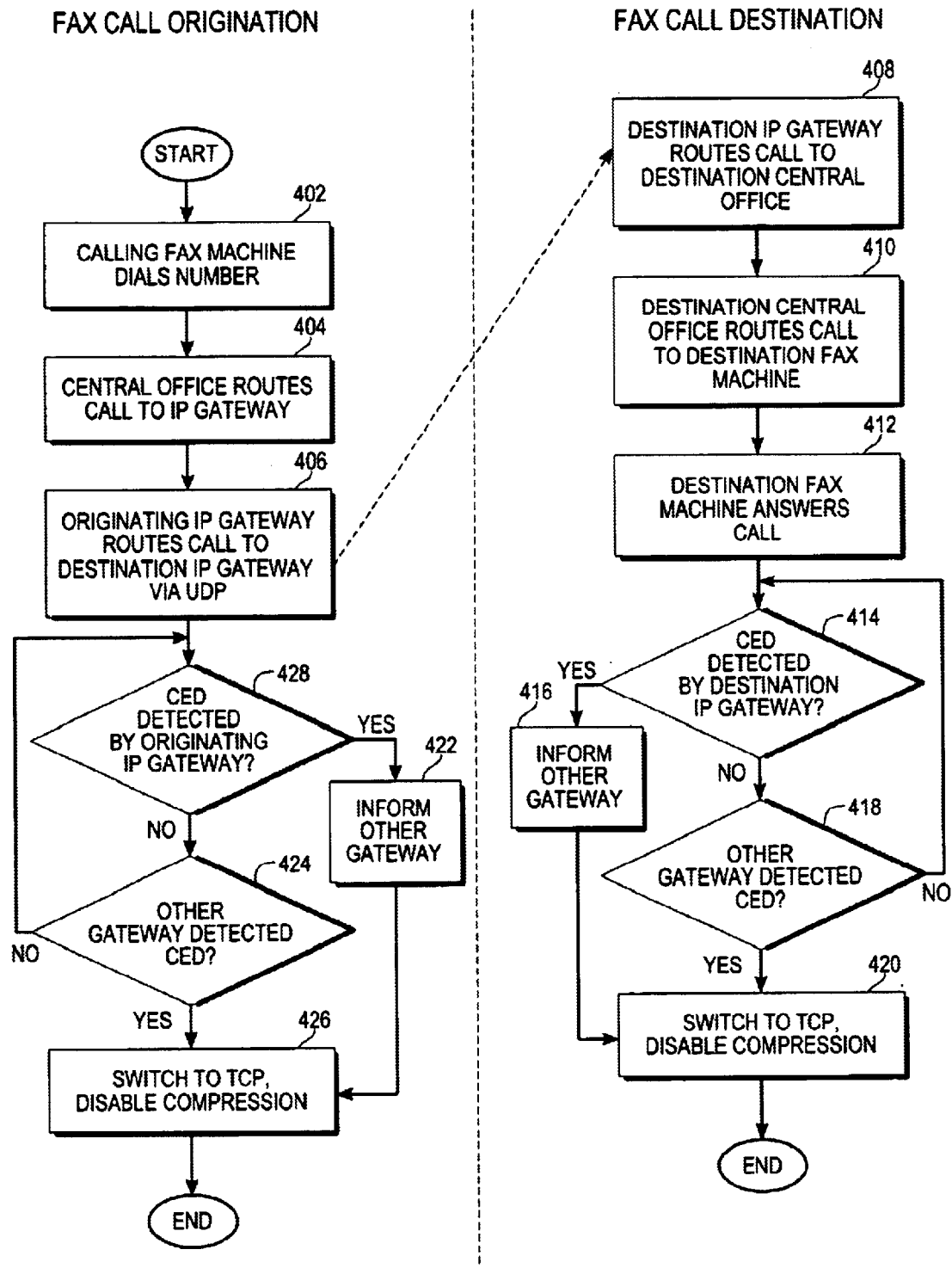
FIG. 5 is a flow diagram of the operation of the communications network.

FIG. 5 is a flow diagram of the operation of IP gateway 106 in accordance with one preferred mode of operation, where a calling facsimile machine (i.e., facsimile device 110) is being operated as a manual facsimile machine to send a facsimile transmission to facsimile device 112.

Operation begins with block 402, where a user dials the telephone number of facsimile device 112 using facsimile device 110. Then, in block 404, telephony network 108, which, in this example, is a central office operated by the public telephone network, routes the call to IP gateway 106. In block 406, IP gateway 106 routes the call to IP gateway 116, which is the destination IP gateway, over IP network 102 contained in WAN 104. Typically, this call is routed via UDP as voice calls are the default type of call.

In block 408, the destination IP gateway (i.e., IP gateway 116) routes the incoming call from facsimile device 110 to telephony network 114. In this example, telephony network 114 is a central office operated by the public telephone network similar to the central office that is telephony network 108. In block 410, after telephony network 114 receives the incoming call, telephony network 114 routes the call to destination facsimile machine, which is facsimile device 112. In block 412, facsimile device 112, which is the destination facsimile machine, answers the incoming call and sends a called (i.e., CED) tone. Facsimile device 112 then waits for initiation of the facsimile transmission and operation continues with block 414.

In block 414, the destination IP gateway (IP gateway 116), seeks to detect the CED tone generated by facsimile device 112. As described above, the CED tone is detectable through the use of a DSP such as DSP 208 of IP gateway 106. If the CED tone sent by destination facsimile device 112, is detected, then operation continues with block 416.

In block 416, the destination IP gateway 116 has detected the CED tone sent by facsimile device 112, and thus informs IP gateway 106 that a CED tone was detected. In response to the detected CED tone, IP gateway 116 switches to using TCP in block 420 and disables compression.

If a CED tone has not been detected by the destination IP gateway 116, a check is made to determine if IP gateway 106 has switched over to using TCP. If IP gateway 106 is not using TCP, operation then returns to block 414. If IP gateway 106 has switched to TCP, then operation continues with block 420.

Although the CED tone generated by facsimile device 112 may be detected by destination IP gateway 116 first as IP gateway 116 is the physically closest IP gateway, the CED tone is still transmitted over IP network 102 in WAN/LAN 104 to IP gateway 106. Thus, in block 428, originating IP gateway, IP gateway 106 detects whether a CED tone is sent by destination facsimile device. If a CED tone is detected, then operation continues with block 422. Otherwise, operation continues with block 424.

In block 422 where originating IP gateway 106 has detected a CED tone sent from destination facsimile device 112, IP gateway 106 notifies the destination IP gateway that a CED tone was detected. Operation then continues with block 426.

In block 424, where a CED tone has not been detected by the local IP gateway 106, sending IP gateway checks if destination IP gateway 116 has detected a CED tone. If IP gateway 116 has not detected a CED tone, then operation returns to block 428. Otherwise, operation continues with block 426.

In block 426, IP gateway 106 switches to sending all facsimile traffic using TCP, and disables compression on any facsimile data which is sent. Thereafter, the facsimile call is handled according to standard methods.

It is to be noted that the CED tone detection may be done not only in DSP 208 of IP gateway 106, but also in a DSP contained in IP gateway 116. In addition, other devices can be used to detect the CED tone, including a gateway's main CPU (e.g., CPU 202 of IP gateway 106), or some device external to the gateway.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
   detecting a facsimile transmission on a digital communication line in a network having a first gateway;
   detecting a first called (CED) tone, wherein said CED tone is detected by a processor in a CED detection device on said data network between said first gateway and a second gateway; and
   generating a first signal in said first gateway to set said first gateway to transmit said facsimile transmission in a first format.

2. The method of claim 1, further comprising:
   generating a second signal to set said first gateway to transmit said facsimile transmission in a time sensitive manner.

3. The method of claim 1, further comprising:
   generating a second signal to set said first gateway to transmit said facsimile transmission using a first protocol.

4. The method of claim 3, where said first protocol is a transmission control protocol.

5. The method of claim 1, where said first format is a lossless format.

6. The method of claim 1, where said first format is an uncompressed format.

7. The method of claim 1, further comprising:
   generating a notification signal to notify said second gateway of said detection of said first CED tone.

8. A computer program embodied on a computer-readable medium comprising:
   a first detection source code segment comprising a first detection function to detect a facsimile transmission on a digital communication line in a network having a first gateway;
   a second detection source code segment comprising a second detection function to detect a first called (CED) tone, wherein said first called (CED) tone is detected by a processor executing the second detection function in a CED detection device on the network between said first gateway and a second gateway; and
   a signaling source code segment comprising a signaling function to generate a first signal in said gateway to set said gateway to transmit said facsimile transmission in first format.

9. The computer program of claim 8, further comprising a second signaling source code segment comprising a second signaling function to generate a second signal to set said first gateway to transmit said facsimile transmission in a time sensitive manner.

10. The computer program of claim 8, further comprising a second signaling source code segment comprising a second signaling function to generate a second signal to set said first gateway to transmit said facsimile transmission using a first protocol.

11. The computer program of claim 10, where said first protocol is a transmission control protocol.

12. The computer program of claim 8, where said first format is a lossless format.

13. The computer program of claim 8, where said first format is an uncompressed format.

14. The computer program of claim 8, further comprising a second signaling source code segment comprising a second signaling function to generate a notification signal to notify said second gateway of said detection of said first CED tone.

15. An apparatus comprising:
   a processor for detecting a first called (CED) tone, wherein said first called (CED) tone is detected by said processor in a CED detection device on a network between a first gateway and a second gateway; and
   a signaling unit coupled to said processor for signaling said first gateway to transmit said facsimile transmission in a first format, wherein said processor detects a facsimile transmission on a digital communication line in the network.

16. A system comprising:

a network;

a first gateway coupled to said network to detect a facsimile transmission on a digital communication line in said network;

a first facsimile device coupled to said first gateway; and, a first called (CED) tone detection unit coupled between said first gateway and a second gateway having:
- a processor for detecting a first CED tone; and
- a signaling unit coupled to said processor for generating a signal to said first gateway to transmit said facsimile transmission in a first format.

17. The system of claim 16, where said digital network further contains a second gateway and said CED tone detection unit further comprises a second signaling unit to generate a notification signal to notify said second gateway of said detection of said first CED tone.

18. A computer data signal embodied in a carrier wave comprising:
- a first detection source code segment comprising a detection function to detect a facsimile transmission on a digital communication line in a network;
- a second detection source code segment comprising a detection function to detect a first called (CED) tone, wherein said first called (CED) tone is detected by a processor executing the second detection function in a CED detection device on the network between said first gateway and a second gateway; and
- a signal source code segment comprising a signaling function to generate a first signal in said gateway to set said gateway to transmit said facsimile transmission in an first format.

19. A method for detecting a facsimile transmission in a data network having a first gateway comprising:

detecting a first called (CED) tone; and generating a first signal in said first gateway to set said first gateway to transmit said facsimile transmission in a first format, wherein said CED tone is detected by a processor in a CED detection device on said data network between said first gateway and a second gateway.

20. The method of claim 19, further comprising:

sending a CED detected signal to said first gateway from said CED detection device.

21. A system comprising:

a data network;

a first gateway coupled to said data network;

a first facsimile device coupled to said first gateway; and, a first called (CED) tone detection unit in said first gateway having:
- a processor for detecting a first CED tone; and
- a signaling unit coupled to said processor for generating a signal to said first gateway to transmit said facsimile transmission in a first format;

wherein said data network further contains a second gateway having a second called (CED) tone detection unit to notify said first and second gateways of said detection of said first CED tone; and wherein said first called (CED) tone detection unit further comprises a second signaling unit to generate a notification signal to notify said second gateway of said detection of said first CED tone.

\* \* \* \* \*